(No Model.)
N. M. WILSON.
VELOCIPEDE WHEEL.
No. 348,605. Patented Sept. 7, 1886.
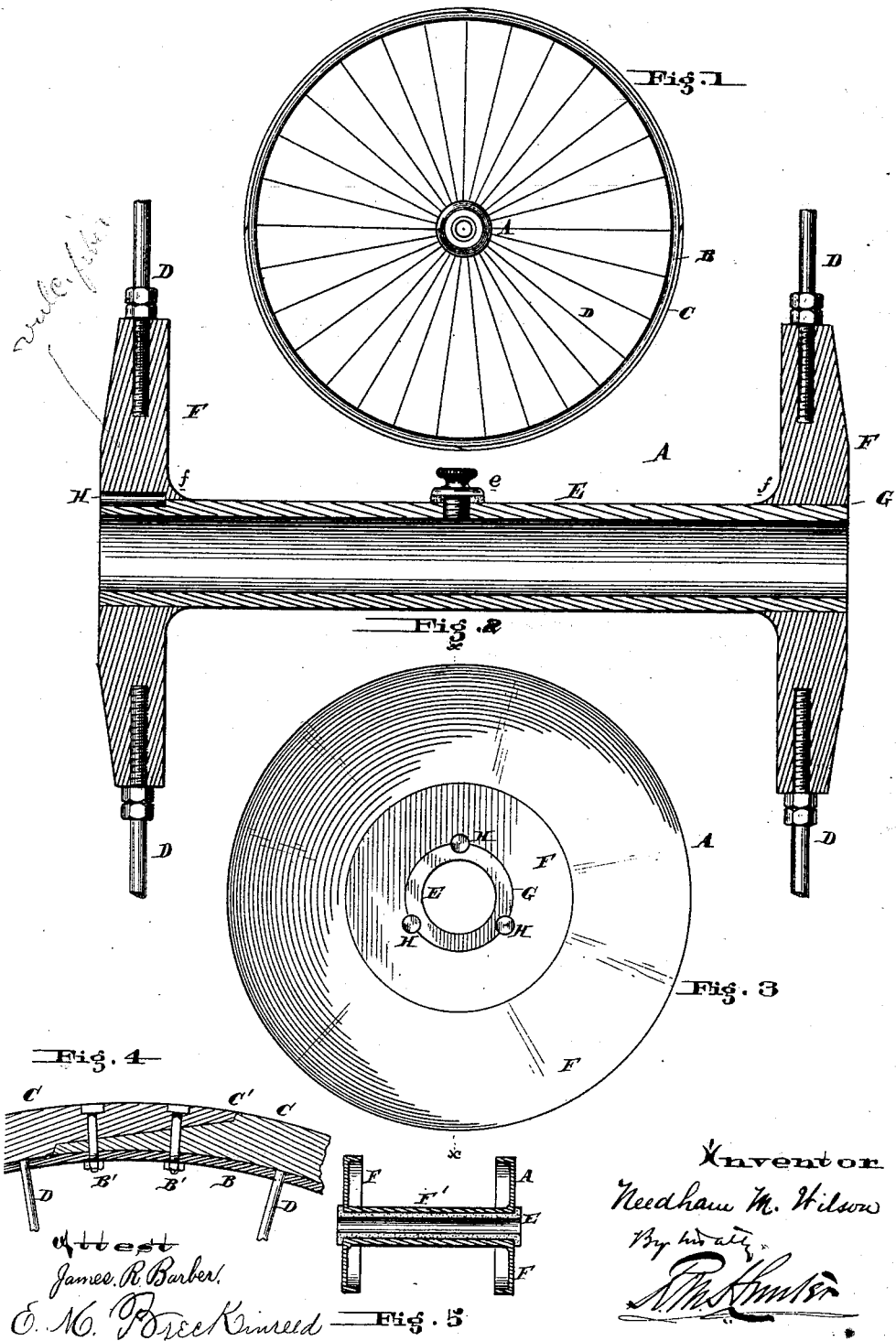

UNITED STATES PATENT OFFICE.

NEEDHAM M. WILSON, OF PHILADELPHIA, PENNSYLVANIA.

VELOCIPEDE-WHEEL.

SPECIFICATION forming part of Letters Patent No. 348,605, dated September 7, 1886.

Application filed January 17, 1885. Serial No. 153,156. (No model.)

*To all whom it may concern:*

Be it known that I, NEEDHAM M. WILSON, of the city and county of Philadelphia, and State of Pennsylvania, have invented a new and useful Improvement in Velocipedes, of which the following is a specification.

My invention has reference to wheels for velocipedes in general; and it consists in a hub formed of a suitable material, like vulcanized fiber, which embodies strength, lightness, and insulating qualities; further, in the said hub when made of three parts united to form a spool, the tubular or axle portion being secured to the disks in any suitable manner; further, in a wheel for velocipedes having a rim or tire formed of vulcanized fiber, the said tire being formed in sections which are secured to each other and upon the felly of the wheel, and in details of construction, all of which are fully set forth in the following specification, and shown in the accompanying drawings, which form part thereof.

Heretofore it has been customary to form velocipede-wheels entirely of metal with the exception of the tire; but in practice there are three main objections thereto—viz., expense, weight, and the fact that the wheel or wheels are not insulated from the rider, and in considering these objections I would observe—

First. The expense of the wheel is greatly due to the fact that the hub must be made in a peculiar manner and shape by which strength without excessive weight is attained; hence the construction of such a hub is expensive, and the finish required in the bearing and exposed parts greatly add to the cost. In addition thereto the spokes must be secured to the rims or disks of the metal hub by the use of nuts or other equally good or equivalent means, and these it is needless to remark greatly increase the cost.

Second. The fact that the wheels are commonly made of metal and use a heavy rubber tire necessarily causes the weight of the wheel or wheels to be burdensome to the rider, particularly in long-distance riding and when steep grades are encountered. Even when descending such grades the heavier the weight of the machine the more wear comes upon the brakes, and this increases the wear and tear of the machine, reducing its life and impairing the working-joints.

Third. The fact that the large supporting and drive wheels of velocipedes (be they bicycles, tricycles, or quadricycles) are not insulated is a great cause of exhaustion and languid feeling which often overcomes velocipede-riders. This is not the same at all times, but varies with the change in climate—such as the hygrometrical and barometrical variations—as in some conditions of the atmosphere the electrical phenomena are not so well felt as in others, and of course some persons are more subject to exhaustion and depressive feelings than others with the same generation of electricity in the machine. The large wheels are the main sources of generation of the electricity, and the axle-bearing is the natural outlet or conductor, and this necessarily connects with that portion of the machine or frame thereof which is in contact with the rider.

My object is to overcome these objectionable features by forming the hub entirely of a material embodying lightness, strength, cheapness, and non-conductivity for electricity. The hub may, if so desired, be formed of metal, but insulated from the body or frame of the machine.

In carrying out my invention I prefer to form the hub of vulcanized paper or fiber, as hereinbefore specified, which material is now well known in the arts and manufactures, the said hub being formed in three parts, the disks or end pieces being cemented or otherwise secured to the central or tubular part, and into these disks I screw the spokes, and owing to the great toughness and tenacity of the vulcanized fiber there is no tendency to split; hence no other means of security is required. These spokes on their outer ends are secured to the usual grooved iron rim or felly in which the sections of vulcanized fiber are placed and properly secured, forming an endless tire. In making this tire the vulcanized fiber is preferably cut in straight or slightly-curved pieces, and afterward bent to conform to the curvature of the wheel-felly, and to which it is secured by bolts or otherwise, and I would observe that by this means the hardest part of the vulcanized fiber is exposed to the direct wear.

In the manufacture of vulcanized fiber it is not convenient to make either irregular parts or large rings, nor would it be desirable in the formation of the hub or tire, for in the former case the weakest edge would be exposed in which to screw the spokes, and in the latter case a tire made in one piece would not expose the edge or grain formed where the material is made in thick sheets and cut to the requisite shapes.

In the drawings, Figure 1 is a side elevation of a wheel for velocipedes embodying my invention. Fig. 2 is a cross-section of the hub of same on line $x$ $x$. Fig. 3 is an end view of the hub. Fig. 4 is a sectional elevation of a small portion of the felly and tire; and Fig. 5 is a sectional elevation similar to Fig. 2, showing a modified form of hub.

A is the hub. B is the felly, preferably of metal. D are the spokes, and C is the tire. The hub is formed of the tubular part E, either cut out of a solid piece of the vulcanized fiber or made by wrapping the paper about a mandrel, forming a tube which is then vulcanized, and to the ends of this tubular section are secured the end pieces or disks, F, by cement, screws, or pins H, the line of juncture being indicated by G. The inner edge of the disks are preferably provided with fillets $f$, to increase the strength.

$e$ is an oiling-hole for the hub if it be journaled upon an axle; but when secured fast to the axle this is dispensed with.

The spokes D are screwed into the peripheries of the disks F of the hub, and, while lock-nuts are shown, they are not necessary, as the screw holds well in the vulcanized fiber.

The tire C is formed of sections, two or more in number, which are united by lapped joints C', (see Fig. 4,) through which bolts B' are passed, binding the sections together, and also to the felly B.

In the modification shown in Fig. 5 the hub is shown as made of metal, F F', with the insulating-tube E inserted therein, this construction being equally well suited to that part of my invention which comprehends the insulating of the velocipede-wheels; hence, while I prefer the construction first set forth, I do not limit myself to the details thereof, as they may be modified in various ways without departing from my invention.

I am aware that it has been proposed to provide carriage-wheels with hubs lined with vulcanized fiber, to obviate lubrication, as is shown in Patent No. 175,943, to Dalzell, and also that it has been proposed to make a wheel of iron or partly of iron and partly of wood, and then coat it with vulcanized rubber, as set forth in English Patent No. 1,095 of 1870; but in this patent a second iron tire is placed about the vulcanized rubber. In neither of these patents is the hub shown as formed wholly of vulcanized fiber, nor is a vulcanized-fiber tire shown made of sections and with its hard edge turned up for wear.

Having now described my invention, what I claim as new, and desire to secure by Letters Patent, is—

1. A velocipede-wheel having its hub formed of vulcanized fiber, and consisting of the tubular section E and end disks, F F, secured together to form a spool, substantially as and for the purpose specified.

2. A velocipede-wheel having its tire formed of two or more sections of vulcanized fiber, substantially as and for the purpose specified.

3. A velocipede-wheel having its tire formed of two or more sections of vulcanized fiber, in which the ends are lapped and secured together by bolts which pass through the felly of the wheel, substantially as and for the purpose specified.

4. In a velocipede-wheel, the combination of the hub formed of vulcanized fiber, the metal spokes and felly, and tire formed of vulcanized fiber and in sections, substantially as and for the purpose specified.

5. The vulcanized-fiber hub formed of tubular section E and end disks, F F, rigidly secured thereto, the grain or plane of greatest strength in the parts E and F being at right angles to each other, substantially as and for the purpose specified.

In testimony of which invention I hereunto set my hand.

NEEDHAM M. WILSON.

Witnesses:
R. M. HUNTER,
WILLIAM C. MAYNE.